Oct. 19, 1943.  F. O. HESS  2,332,380
FIRECHECK
Filed July 17, 1940  2 Sheets-Sheet 2
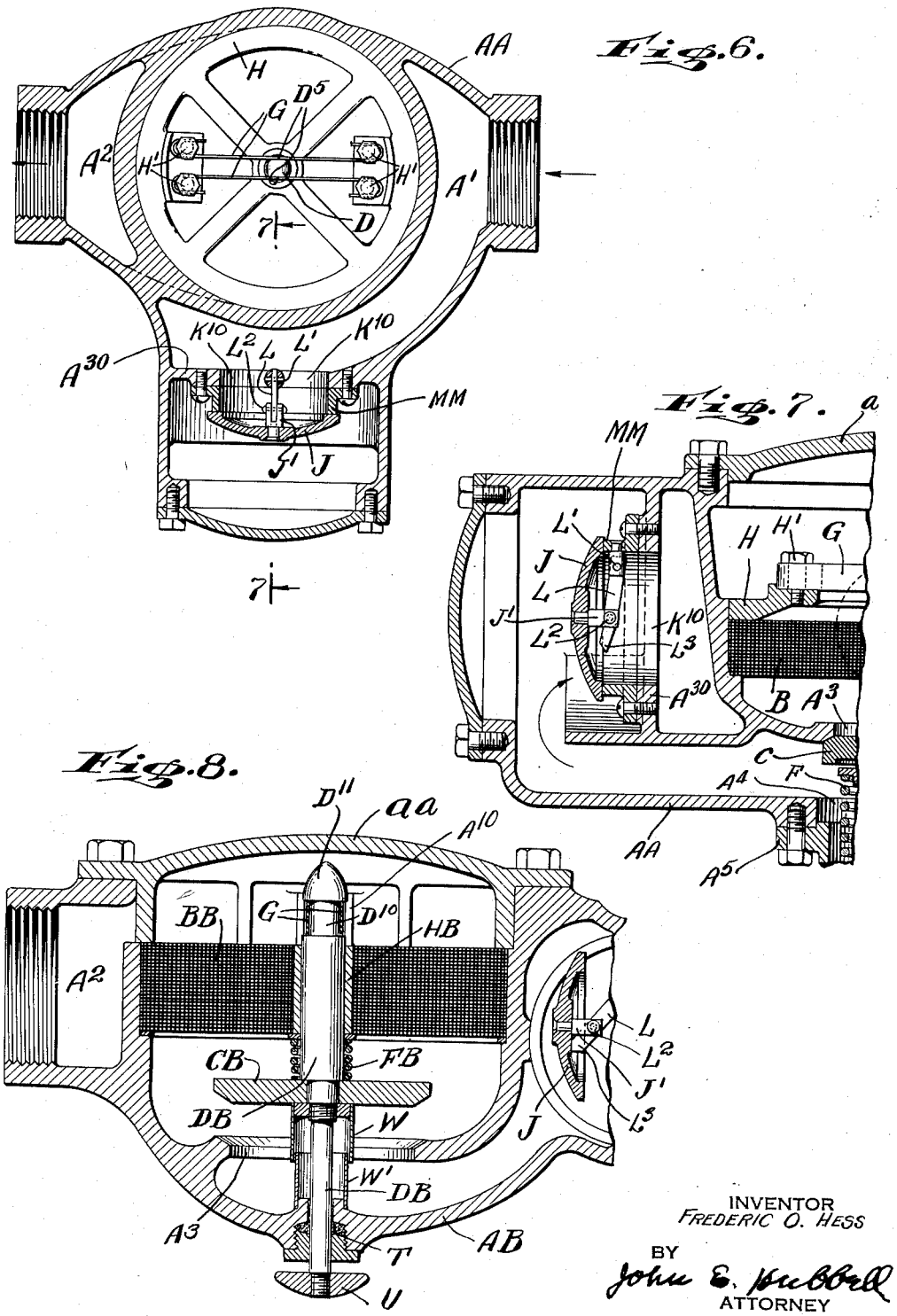
INVENTOR
FREDERIC O. HESS
BY
John E. Hubbell
ATTORNEY Patented Oct. 19, 1943

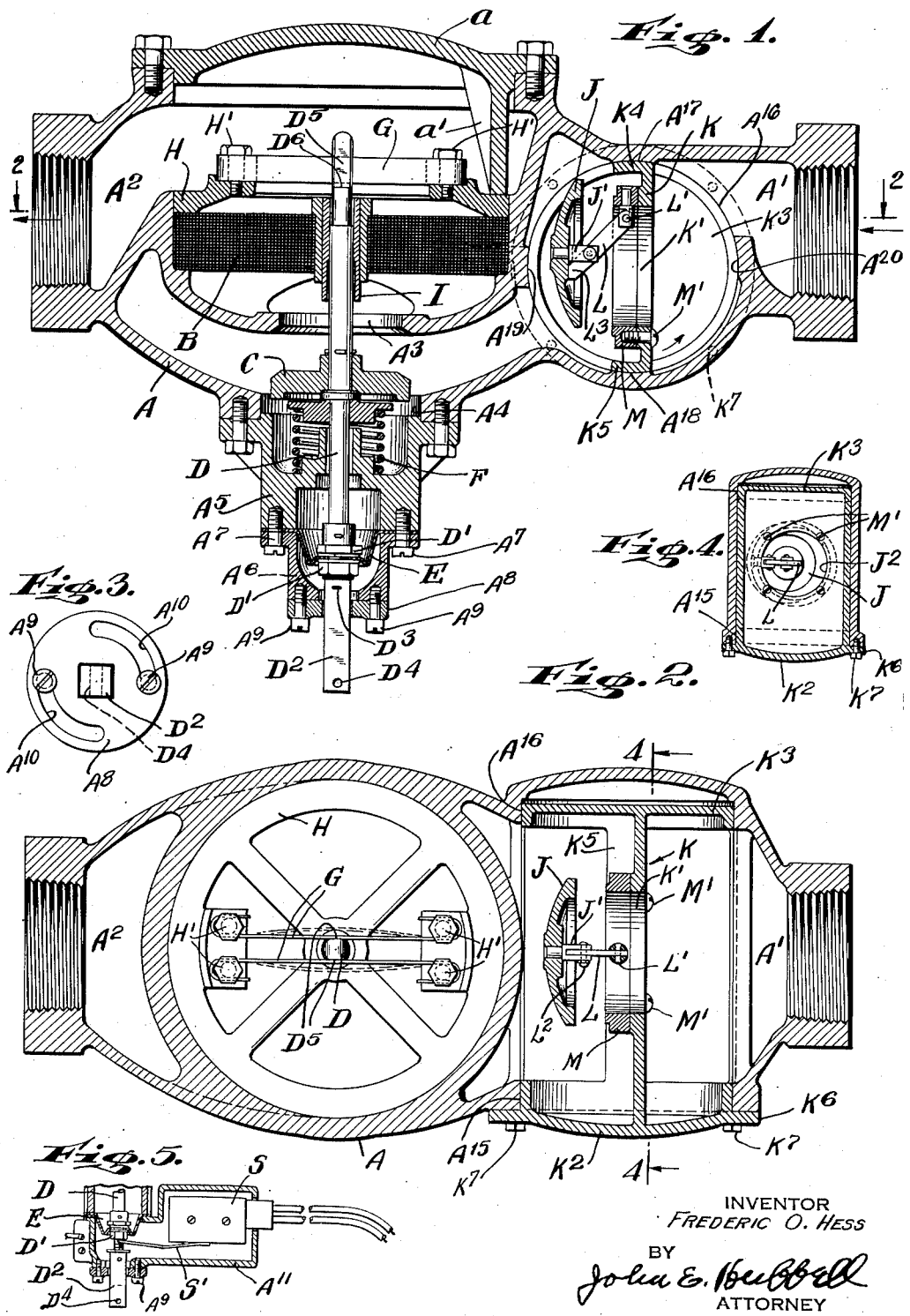

2,332,380

UNITED STATES PATENT OFFICE 2,332,380

FIRE CHECK

Frederic O. Hess, Philadelphia, Pa., assignor to The Selas Company, Philadelphia, Pa., a corporation of Pennsylvania Application July 17, 1940, Serial No. 345,946

20 Claims. (Cl. 48—192)

The general object of the present invention is to provide an improved device, commonly designated a firecheck, adapted for incorporation in a conduit or pipe through which a combustible mixture of air and gas or other combustible gaseous fluid is supplied to a burner, furnace chamber, or other place of use, to form a barrier to the passage of flame, on the occurrence of backfire in the portion of the conduit or pipe at the outlet side of the firecheck.

My improved firecheck device comprises a fire screen in the path of gas flow, and novel valve means at the inlet side of the fire screen, operative, on the development of backfire at the outlet side of the screen, to prevent the flame from traveling back through the screen. In the preferred form of the present invention, the said valve means comprises two separate valve mechanisms, each individually novel and useful, but adapted to coact with one another and with the screen, under certain conditions, to produce a useful effect obtainable only by the con-joint use of both valve mechanisms and the screen.

One of said valve mechanisms comprises a valve member which is strongly biased for movement from an open position into a position in which it closes the path of flow, and which is combined in a novel manner with thermostatic means normally holding the valve in its open position, but actuated automatically, on an increase in its temperature resulting from backfire, to release said valve member, and permit the latter to close rapidly under its bias force. Said valve mechanism preferably includes means external to the firecheck casing or body, indicating whether the said valve member is in its open or in its closed position, and manually operable to move the valve from its closed into its open position, in which it may be relocked by the thermostatic means, when the latter has cooled down from its normal temperature.

The second valve mechanism serves as a check or non-return valve, and is arranged to have its movable valve element subjected to a bias force which tends to hold the valve in its closed position, but it is so slight that the valve will open under a pressure at its inlet side which is only a very little greater than the pressure at its outlet side. The last mentioned valve mechanism includes provisions for the adjustment of its position relative to the body or casing of the firecheck, so that the same gravitational bias or valve closing effect may be obtained, with said body or casing in any one of a number of different positions in which it may be installed.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Of the drawings:

Fig. 1 is an elevation in section of one embodiment of the present invention;

Fig. 2 is a section on the line 2—2 of Fig. 1;

Fig. 3 is an inverted plan view of a portion of the apparatus shown in Fig. 1;

Fig. 4 is a small scale section through an adjustable partition element, the section being taken on the line 4—4 of Fig. 2;

Fig. 5 is a section taken similarly to Fig. 1, illustrating the use of a feature not included in Fig. 1;

Fig. 6 is a section, taken similarly to Fig. 2, through a second embodiment of the invention;

Fig. 7 is a partial section on the line 7—7 of Fig. 6; and

Fig. 8 is a partial section taken similarly to Fig. 1 illustrating another modification.

In the form of the invention shown in Figs. 1-4, my improved device comprises a valve casing A, having an inlet A' and an outlet $A^2$ in alignment with the inlet, and having a valve seated port $A^3$ formed in a partition interposed between said inlet and outlet. As shown, the valve casing is also formed with a seat for a pervious metallic barrier B, or fire screen, extending across the path of flow from the valve port $A^3$ to the outlet $A^2$. The fire screen may be of any usual or suitable construction, and may well be formed in a known manner of wire netting or of thin corrugated metal strip material. As shown, the fire screen B is normally held against displacement by depending fingers $a'$ of a removable head $a$, which closes an opening in the side of the valve casing toward which the port $A^3$ opens.

A valve C of disc form is mounted in the valve casing for movement from its open position, in which it is displaced from the port $A^3$ and the fire screen B, into a position in which it engages the valve seat at the margin of the port $A^3$, and closes the latter. The portion of the valve stem D at the inlet side of the valve C, extends through an opening $A^4$ in the wall of the valve casing, and through a passage in a head $A^5$. The latter normally extends across the opening $A^4$ and is bolted to the valve casing, but may be removed to permit the insertion and removal of the valve C. Suitable provisions are advantageously made to prevent leakage out of the valve casing along the valve stem D, without creating objectionable frictional resistance to the movements of the valve C toward and away from its seat. To this end, in the construction shown in Figs. 1–4, use is made of a flexible rubber diaphragm E, through which the valve stem D extends. The diaphragm has its peripheral edge clamped between an annular outer end surface of the head $A^5$ and an annular clamping member $A^6$ which is secured to the member $A^5$ by bolts $A^7$. The portion of the diaphragm E adjacent the valve stem is clamped between nuts or collars D' carried by the valve stem D.

Because of its association with thermostatic valve locking means, as hereinafter explained, the structure shown in Figs. 1–4 includes provisions which are normally operative to prevent rotative movements of the valve stem D, but which may be adjusted to permit of a limited angular movement of the stem. Said provisions comprise a disc like part $A^8$, normally clamped against the annular outer end surface of the part $A^6$ by bolts $A^9$, which extend through arc shaped slots $A^{10}$ formed in the member $A^8$, as shown most clearly in Fig. 3. The slots $A^{10}$ are long enough to permit the part $A^8$ to be rotated 90° about the axis of the valve stem, when the clamping bolts $A^9$ are released. The part $A^8$ is formed with a central aperture rectangular in cross section, and the external end portion $D^2$ of the valve stem, is also square in cross section, and is proportioned to extend through, and to have a sliding fit in the opening in the part $A^8$. The latter thus forms a spline connection between the valve stem and the firecheck casing. The valve portion $D^2$ may be formed with a threaded socket receiving the threaded end of the cylindrical body portion of the valve stem, and may be held against rotation relative to the latter, by a key or pin $D^3$. The external end of the valve stem portion $D^2$ forms a handle through which the valve disc C may be given angular and longitudinal adjustments, and as shown, is formed with a transverse passage $D^4$ for engagement by a wrench, hook or other operating implement.

A spring F acting between the valve C and the head $A^5$, biases the valve C for movement into a position in which it closes the port $A^3$. Normally, the valve is locked in its open position, as shown in Fig. 1, by thermostatic means comprising side by side strips G of thermostatic metal. Each strip G has its ends looped about a corresponding pair of studs or posts shown as formed by bolts H' having their ends screwed into a screen supporting or clamping element or spider H having an annular rim portion interposed between the ends of the fingers a' and an annular rim portion of the screen B. When at normal temperatures, the strips G are straight and parallel to, and normally in engagement with the surfaces $D^5$ at the opposite sides of the adjacent flattened end of the valve stem D. When the strips engage the surfaces $D^5$, the edges of the strips adjacent the screen B, engage the transverse valve stem shoulders $D^6$ at the adjacent ends of the said surfaces, and thus lock the valve in its open position.

When the temperature of the thermostatic strips are raised, as when a backfire condition occurs, the strips G bow away from one another, into the positions shown in dotted lines in Fig. 2, and thus move out of engagement with the shoulders D. This permits the valve C to be forced into its closed position by the spring F. After the strips have cooled down to their normal temperatures and the valve C is moved into its open position by the valve stem portion $D^2$, and the strips G spring into locking engagement with the shoulders $D^6$.

Under normally operating conditions, the thermostatic strips G may not be heated to effect automatic closure of the valve C during long periods, and the splined connection including part $A^8$ between the valve stem and valve casing has been provided to permit tests to be made from time to time to determine the operative condition of the valve, and in particular to determine whether it will close under the action of the spring F, whenever the locking engagement of the strips G with the shoulders $D^6$ is interrupted. That engagement may be interrupted, for test purposes, by loosening the bolts $A^9$ and then giving a quarter turn to the member $A^8$, which is provided for this purpose. The quarter turn of the valve stem thus effected moves the surfaces $D^5$ and shoulders $D^6$ out of position for engagement by the strips G, so that the latter cannot then interfere with longitudinal movement of the valve stem D.

The screen B and the above described mechanism including the valve member C and the thermostatic elements G, are effective to prevent objectionable backfiring consequences under some conditions of operation, and provide all the protection against backfiring needed in some installations. The screen B and said valve mechanism cannot be relied upon, however, to prevent the travel of the backfire flame through the screen, when the backfire results in a significant increase in the pressure in the portion of the piping in which backfire combustion is occurring. Any backfire combustion in the piping results in expansion and a corresponding increase in gas pressure. The magnitude of the pressure increase thus produced depends upon various conditions including the character of the piping, but is primarily dependent on the rate of flame propagation. The latter, depends primarily on the composition of the gaseous fuel in the piping. Ordinarily, it is only when the rate of flame propagation is relatively rapid, that the resulting pressure increase in the piping is great enough to be of especial significance from the firecheck standpoint.

In general, the pressure increase condition due to the backfiring, may be considered as resulting in a pressure wave which travels back through the piping, somewhat in advance of the backfire flame. In the absence of suitable corrective means, a significant pressure wave is apt to be followed through the fire screen by the rapidly traveling backfire flame creating the pressure wave. While it is theoretically possible to employ a fire screen with a perviosity so low and a heat absorbing capacity so high, that no backfire flame will pass through the screen, such a screen would offer too much resistance to gas flow and create too great a gas pressure drop, under normal operating conditions, to make its use not practically feasible in ordinary industrial gas burning installations.

The second valve mechanism provided in accordance with the present invention is, in effect, a check or non-return valve located in the piping at the inlet side of the screen and sufficiently near the latter to prevent the portion of the piping between it and the screen from having objectionable reservoir capacity for back flowing gas. This check or non-return valve is formed and disposed to quickly close the gas passage as soon as the pressure at its outlet side is significantly increased. The closure of the valve and consequent checking of the back flow through fire screen tends to hold the backfire flame at the outlet side of the screen in proper position to quickly heat up the thermostatic locking strips and thus permit the closure of the valve member C. The unlocking of the valve C need not, and ordinarily will not occur until after the initial pressure wave has subsided and the reopening of the non-return valve member has permitted a resumption of the normal flow of the combustible mixture to and through the fire screen, thereby maintaining the flame at the screen until the thermostatic strips G are sufficiently heated to release the valve C.

In the preferred form of the present invention shown in Figs. 1-4, the second valve mechanism is maintained in the fire check casing A, and comprises a valve disc J controlling a port K' in a partition K extending across the gas passage within the casing A, between the inlet A' and the port A³. As shown, the valve disc J is link connected, or hinged, by a link L to an annular valve seat member M, the latter being secured by bolts M' to the partition K coaxially with the port K'. The link L has its upper end connected to the member M by a pivot L' and adjacent its lower end is connected by a pivot L², to a horizontally disposed stem J' attached to and coaxial with the valve disc J. When the latter is in its wide open position, shown in Fig. 1, it is positively held with its axis horizontal by the engagement of the lower end portion L³ of the link with a portion of the valve disc at some distance below the axis of the latter.

With the described arrangement, the weight of the valve disc J and link L constitutes a gravitational bias force, tending to move the valve disc J into the position in which it engages the adjacent side of the valve seat member M and closes the port K'. The described arrangement permits the parts to be so proportioned, that the gravitational valve closing bias force, while positive and not apt to be rendered inoperative by friction, may be so slight that the excess of the pressure on the supply side, over that at the outlet supply of the port K', needed to move the valve disc J into its open position, may be small and insignificant.

For effective use in the intended manner, the axis of the port K' and the pivots L' and L² should each be substantially horizontal, and the pivot L' should be above the valve disc axis generally as shown in Fig. 1. To permit this relation of the parts with the firecheck casing or body A in different positions, the bolts M' and the corresponding bolt holes are disposed to permit the valve seat member to be secured to the partition member K in different angular adjustments about the axis of the port K'; and the partition member K is adjustably mounted in the valve casing A so that the axis of the port K' may be horizontal with the valve casing in the position in which the common axis of its inlet A' and outlet A² is either vertical or horizontal. The angular adjustment of the valve seat member M relative to the partition member K permits the pivot L' to be above the axis of the valve disc with the body A adjusted into any one of several different angular positions about the horizontally disposed common axis of the inlet A' and outlet A².

To facilitate the described adjustment of the partition K relative to the firecheck casing A, the latter is formed with cylindrical seats A¹⁵ and A¹⁶, at opposite sides of the gas passage and adapted to respectively receive end portions K² and K³ of the partition member K having cylindrical seat engaging surfaces. The plate like body partition of the member K is formed with side edge portions K⁴ and K⁵ having outer surfaces which are portions of the same cylindrical surface including the seat engaging surfaces of the partition ends K² and K³. In the position of the partition K relative to the body A shown in full lines in Fig. 1, the cylindrical outer surfaces of the edge portions K⁴ and K⁵, engage correspondingly shaped seat surfaces A¹⁹ and A²⁰ of the body A. The surfaces A¹⁹ and A²⁰ are also located at the opposite sides of the gas passage between the inlet A¹ and port A³, but are angularly displaced 90° from the surfaces A¹⁷ and A¹⁸, respectively, about the axis of the cylindrical seats A¹⁵ and A¹⁶. The cylindrical seat A¹⁵ is open-ended, and the corresponding partition end portion K² includes a flange portion K⁶ adapted to engage the outer surface of the body A at the margin of the seat A¹⁵, and to be secured to said body in different relative positions by means of suitably located bolts K⁷.

The general operation of the apparatus shown in Figs. 1-4, will be apparent from what has already been said. The normal condition of the firecheck is that illustrated in the drawings in which the valve member C is latched in its open position by the thermostatic elements G, and in which the valve member J is held in its open position by the gas flow through the port K'. On the development of a backfire at the burner or furnace supplied with a combustible fluid through the piping including the firecheck device, the flame will travel back through the piping at a speed varying with conditions, and particularly with the pressure increase produced by the backfire in the piping at the outlet side of the firecheck.

In some cases, the pressure increase may be small as to have a negligible effect upon the gas flow to the firecheck. In some cases, however, the momentary pressure increase will create a rapid back flow through the firecheck. Any decrease in the normal gas flow to the firecheck means an increase in the rate at which the backfire flame approaches the fire screen, and when the pressure increase attains a certain critical value, varying in different installations and with different conditions of operation, the flame would pass into and through the fire screen, without heating the strips G sufficiently to release the valve member C, if the firecheck did not include the non-return valve J, which by its closure checks the backfire flame travel. As previously indicated, the pressure wave which causes the valve member J to close, is only momentary, and ordinarily the valve J will reopen before the strips G are heated to release the valve C. The reopening of the valve J permits the gas to flow to the screen, and thus insures the maintenance of the flame at the outlet side of the screen until the valve C is released and closes.

When the backfire does not develop a pressure increase closing the valve J, the backfire flame will approach the fire screen at a velocity sufficiently low to permit the fire screen to check the travel of the flame and maintain the flame at the outlet side of the screen until the strips G heat up and release the valve C. The closure of the latter then interrupts the gas supply to the screen and permits the strips G to cool down so that the valve may be relocked in its open position, when moved into that position by a pull on the external end of the valve stem portion $D^2$.

An important practical advantage of the mechanism is that the external portion $D^2$ of the valve stem serves as an indicator showing whether the corresponding valve C is open or closed, and thereby showing whether backfire has occurred in the piping including the firecheck. The value of such an indicator is especially great in industrial gas heating uses where a single furnace or heating device may have a score or more burners each provided with an individual firecheck. When one of the burners of such a furnace or heater backfires, the operator may not learn promptly that a backfire has occurred unless he hears the noise created. When the operator does learn that a burner has backfired, it is ordinarily difficult for him to readily determine which burner has backfired in the absence of suitable firecheck indicating provisions. With the firechecks illustrated in Figs. 1–4, the operator can tell by a glance at the fire check stem parts $D^2$ which burner has backfired. Usually, it is practically important to promptly identify the burner which has backfired, since backfiring usually results from some burner injury or maladjustment which should be quickly corrected to insure efficient operation and to avoid further injury.

The firecheck mechanism shown in Figs. 1–4, may readily have added to it electrical means whereby the closure of the valve C may operate an indicator at a distance from the firecheck, or may create a control effect such, for example, as the shutting down of the gas mixing machine supplying combustible mixture to the piping including the firecheck. As shown in Fig. 5, a chambered part $A^{11}$ replaces the part $A^6$ of Fig. 1. The part $A^{11}$ differs from the part $A^6$ essentially only in that it is shaped to receive an electric switch mechanism S including a resilient switch actuating element S'. The latter bears against a nut D' carried by the valve stem D, so that a closing movement of the stem D will actuate the switch S. The latter may be, and as shown is, a well known commercial type of switch suitable for the purpose. As will be apparent, the provisions illustrated in Fig. 5 for actuating the switch S, do not prevent the valve stem portion $D^2$ from giving local indication of the actuation of the switch C.

The form of the invention shown in Figs. 6 and 7 differs from that previously described in that port $K^{10}$, controlled by the check valve element J, is formed in an integral portion $A^{30}$ of the fire check casing AA. The valve seat member MM of Figs. 6 and 7, is operatively identical with the previously described member M and the hinge link connection between the said member MM and valve J may be, and as shown is, identical with the hinge link connection between the member M and J of the construction first described. With the construction shown in Figs. 5 and 6, the pivot L' may be kept above the axis of the valve J, by suitable angular adjustment of the valve seat member relative to the partition $A^{30}$, with the fire check body AA in different positions provided they are not such as to prevent the axis of the port K from being kept horizontal.

The embodiment of the invention illustrated in Fig. 8 differs from that shown in Figs. 1–4 in the arrangement of its thermostatical valve member CB, replacing the previously described valve C, at the outlet side of the port $A^3$ in the casing or body AB, and in the operating and controlling means associated with the valve member CB. In Fig. 8, the valve CB is biased to its seat by a spring FB acting between the valve member and a thimble or sleeve HB coaxial with and mounted in the fire screen BB. The thermostatic strips G of Fig. 8 are supported by portions $A^{10}$ of the head aa replacing the head a of Figs. 1–4. The said strips G are normally received in a notch $D^{10}$ formed in the valve stem DB. The adjacent end $D^{11}$ of the stem DB is made conical to wedge the strips G out of their normal positions, when the valve CB is being normally opened. The end of the stem DB at the inlet side of the port $A^3$ extends through a stuffing box T mounted in the casing AB, and is provided at its extended end with an operating knob. To prevent dust deposits on the valve stem DB interfering with its movement through the stuffing box T, telescoping cylindrical dust guards W and W' are carried by the valve member CB and casing AB respectively. This application is a continuation in part of my co-pending application Serial No. 282,653 filed July 3, 1939.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A firecheck for incorporation in a combustion fluid supply conduit comprising a port, a pervious fire screen at the outlet side of said port, a valve movable between open and closed positions in which it respectively permits and prevents flow of fluid through said port, means constructed and arranged to normally maintain said valve in its open position and to effect its movement into its closed position on the development of backfire in said conduit, said means comprising a thermostatic element adjacent and subject to the temperature adjacent said screen and adapted when in a locking position to maintain said valve in its open position and tending to deflect out of said locking position as the temperature increases above a predetermined normal value, and means adapted to effect the return of said valve to its open position after normal temperature prevails, thereby permitting the thermostatic element to return to its locking position.

2. A firecheck comprising a casing having an inlet and an outlet for a combustible fluid and having a port intermediate the inlet and outlet, a pervious fire screen mounted in said casing at the outlet side of said port, a movable valve mounted in said casing and biased for movement from an open position into a position in which it closes said port and normally movable into said open position, a bimetallic thermostatic latching device within said casing at the outlet side of said screen and responsive to the temperature within said casing and adapted when in a latching position to engage said valve and hold the latter in its open position and tending to deflect out of said locking position as the temperature increases above a predetermined normal value, and means adapted to effect the return of said valve to the open position as normal temperature prevails, thereby permitting the bimetallic thermostatic latching device to return to its locking position.

3. A firecheck comprising a casing having an inlet and an outlet for a combustible fluid and having a port intermediate the inlet and outlet, a pervious fire screen mounted in said casing between the port and the outlet, a valve mounted in said casing for movement between an open position into a position in which it closes the port, and means responsive to the temperature within said casing and constructed and arranged to hold said valve open when said temperature is normal and to effect the closure of said valve on an increase in temperature, said means comprising a bimetallic thermostatic latching part normally in locking position to engage said valve and hold it in its open position and tending to deflect out of said locking position as the temperature increases above a predetermined normal value, and means adapted to effect the return of said valve to the open position as normal temperature prevails, thereby permitting said bimetallic thermostatic latching part to return to its locking position.

4. A firecheck comprising a casing having an inlet and an outlet for a combustible fluid, a valve in said casing for controlling flow of fluid therethrough, a fire screen positioned in said casing between said valve and the outlet, resilient means tending to move said valve toward its closed position, bimetallic thermostatic holding means normally operable to hold said valve in an open position against the action of said resilient means, said holding means being rendered temporarily inoperable to hold said valve in an open position against the action of said resilient means by an abnormal rise in temperature in said casing at the discharge side of said fire screen resulting from a backfire, and means associated with said valve for moving the latter to an open position against the action of said resilient means after the occurrence of a backfire has rendered said holding means temporarily inoperable to hold said valve in its open position.

5. A firecheck as set forth in claim 4 in which said means associated with said valve for moving the latter to an open position after the occurrence of backfire includes a rotatable part operable from the exterior of said casing, and in which said valve and said holding means are so constructed and arranged that said part can also be rotatably operated from the exterior of said casing during normal operation and without the occurrence of backfire to render said holding means ineffective to hold said valve in an open position against the action of said resilient means.

6. The combination with a conduit adapted to be connected to a source of supply of combustion fuel, of a fire screen, a first valve, said fire screen and first valve being positioned in said conduit so that combustion fuel normally flows successively past said first valve and thence through said fire screen, resilient means tending to move said first valve toward its closed position, bimetallic thermostatic holding structure normally operable to hold said first valve in an open position against the action of said resilient means, said valve holding structure being rendered inoperable to hold said first valve open against the action of said resilient means by an abnormal rise in temperature in said conduit at the discharge side of said fire screen resulting from a backfire, and a second valve in said conduit through which combustion fuel normally flows before passing through said first valve, said second valve being operable to shut off flow of fuel responsive to a predetermined rise in pressure in said conduit between said first valve and said second valve and resulting from a backfire in said conduit.

7. A firecheck as specified in claim 2, in which said valve has a stem portion extending through the casing wall and formed of a non-corrodible metal.

8. A firecheck as specified in claim 2, in which said valve has a stem extending through a stationary guide passage and in which said valve and casing support telescopic tubular parts surrounding the portion of said stem which moves into said guide passage when said valve is closed.

9. A firecheck as specified in claim 1, in which said valve comprises a stem portion extending through said fire screen and formed with a latch engaging shoulder, and in which the means for holding said valve in its open position comprises a bar including integrally connected layers of metals having different coefficients of thermal expansion which is mounted in said casing to extend transversely of said stem into latching engagement with said shoulder when at a normal temperature, and which is adapted to bend out of engagement with said shoulder when heated to a temperature above normal.

10. A firecheck as specified in claim 2, including flexible diaphragm means to seal the joint between the casing and the portion of the valve stem extending through the casing.

11. A firecheck as specified in claim 2, in which said valve has a stem extending through the valve casing wall and in which said casing supports an electric switch adapted to be actuated by said stem as the valve moves between its open and closed positions.

12. The combination with a combustion fuel supply conduit, of a fire screen in said conduit, a normally open valve in said conduit at the inlet side of said screen, means including a thermostatic element responsive to the temperature in said conduit at the outlet side of said screen constructed and arranged to effect the closure of said valve on an abnormal increase in said temperature, and a second valve at the inlet side of and adjacent to said fire screen and constructed and arranged to open or close accordingly as the pressure at its inlet side is higher or lower than the pressure at its outlet side.

13. A fire check comprising a casing having an inle and outlet for combustible fluid, a fire screen in said casing, a normally open valve in said casing at the inlet side of said screen, means including a thermostatic element responsive to the temperature in said casing at the outlet side of said screen constructed and arranged to effect the closure of said valve on an abnormal increase in said temperature, and another valve means in said casing at the inlet side of and adjacent said fire screen and comprising a ported valve seat member and a valve member mechanically connected to said seat member and gravitationally biased to its closed position when said seat member is in an upright position, and constructed and arranged to open or close accordingly as the pressure at the inlet side of said valve seat member is higher or lower than the pressure at its outlet side.

14. A fire check comprising a casing having an inlet and outlet for combustible fluid, a fire screen in said casing, a normally open valve in said casing at the inlet side of said screen, means including a thermostatic element responsive to the temperature of said casing at the outlet side of said screen and constructed and arranged to effect the closure of said valve on an abnormal increase in said temperature, another valve means in said casing at the inlet side of and adjacent said fire screen and comprising a ported valve seat member and a valve mechanically connected to said seat member and gravitationally biased to its closed position when said seat member is in an upright position, and adapted to open or close accordingly as the pressure at the inlet side of said valve seat member is higher or lower than the pressure at its outlet side, said casing and valve seat member being relatively constructed and arranged to permit adjustment of said member into different positions relative to said casing to permit said member to occupy its upright position with said casing in different positions.

15. A firecheck comprising a casing having an inlet and outlet for combustible fluid, non-return valve means comprising a ported valve seat member and a cooperating valve member which, when said valve seat member is in an upright position, is gravitationally biased for movement into a closed position in which it prevents back flow through the ported valve seat member, said ported valve seat member being rotatable within the casing so as to permit the valve member to retain a gravitationally biased position independent of the casing position.

16. A firecheck as set forth in claim 15, including a partition member formed with a port and adapted to be mounted in said casing so that it is rotatable therein and including means for securing said valve seat member to said partition member in different angular positions in each of which the valve seat is in register with said port.

17. A firecheck as specified in claim 2, in which said valve comprises a shoulder moved by angular rotational adjustments of said valve into and out of a position for operative engagement with said latching device when the latter is in its latching position.

18. A fire check as specified in claim 2, in which said valve comprises a shoulder moved by angular rotational adjustments of said valve into and out of a position for operative engagement with said latching device when the latter is in its latching position, and in which said valve comprises a stem portion extending through an opening in said casing by which said valve may be angularly adjusted.

19. A fire check as specified in claim 2, in which said valve comprises a shoulder moved by angular rotational adjustments of said valve into and out of a position for operative engagement with said latching device when the latter is in its latching position, and in which said valve comprises a stem portion extending through an opening in said casing by which said valve may be angularly adjusted, and in which said casing and stem are connected by a flexible diaphragm sealing said opening and in which said casing and stem comprise cooperating parts controlling the angular adjustment of said valve.

20. A fire check comprising a casing having an inlet, an outlet and a flow passage for combustible fluid connecting said inlet and outlet and also having a ring shaped wall seat, a partition member having a portion annular in cross section seated in said seat and comprising a partition extending across said passage and formed with a port and being rotatable in said seat to maintain the axis of said port horizontal independent of position of said casing, and non-return valve means comprising a valve seat member mounted on said partition and rotatable thereon about said axis, said valve seat member being formed with a second port in register with the first mentioned port of partition member, and a non-return valve member mounted on said valve seat member and which is permitted to retain a gravitationally biased position independent of casing position by means of the rotatable valve seat member for movement into a position in which it closes said second port.

FREDERIC O. HESS.

CERTIFICATE OF CORRECTION.

Patent No. 2,332,380.  October 19, 1943.

FREDERIC O. HESS.

It is hereby certified that error appears in the printed specification of the above numbered patent requiring correction as follows: Page 2, second column, line 2, for "shoulders D" read --shoulders $D^6$--; page 5, second column, line 59, claim 13, for "inle" read --inlet--; same line, after "fluid" insert a comma; page 6, first column, line 17, claim 14, strike out "adapted" and insert instead --constructed and arranged--; and that the said Letters Patent should be read with this correction therein that the same may conform to the record of the case in the Patent Office.

Signed and sealed this 1st day of February, A. D. 1944.

(Seal)
Henry Van Arsdale,
Acting Commissioner of Patents.